June 6, 1967   F. T. RIDDY   3,323,618
AUTOMATIC ADJUSTER FOR VEHICLE BRAKES
Original Filed April 1, 1963   5 Sheets-Sheet 4
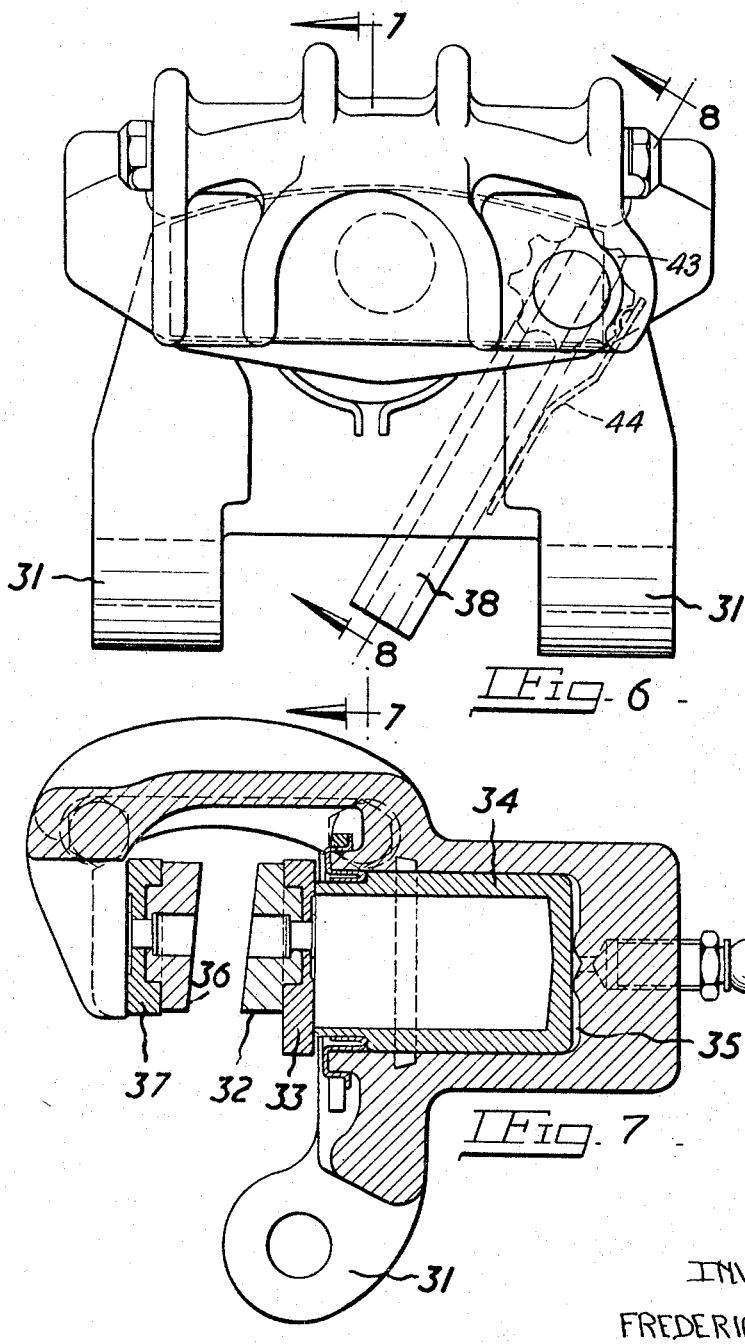
INVENTOR
FREDERICK T. RIDDY
BY Scrivener + Parker
ATTORNEYS

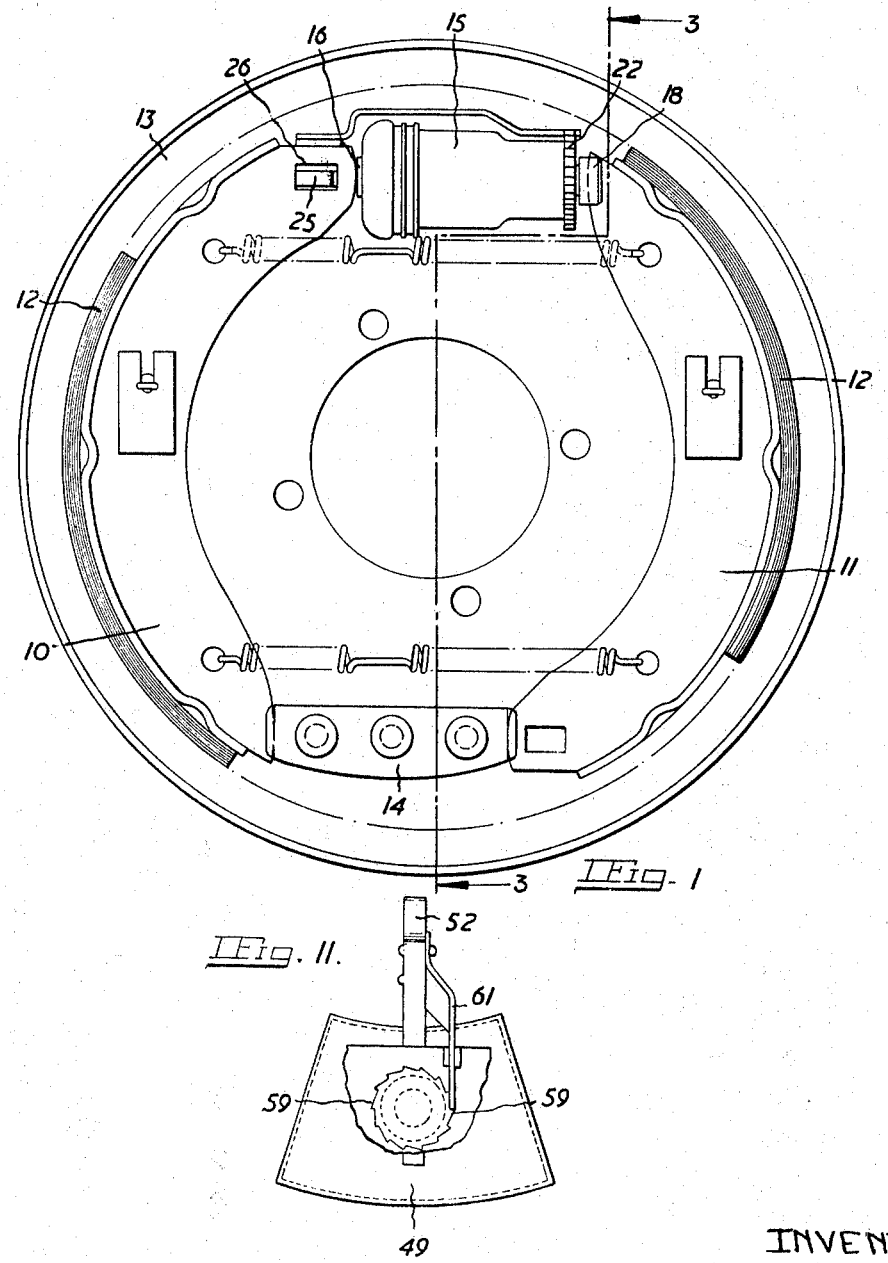

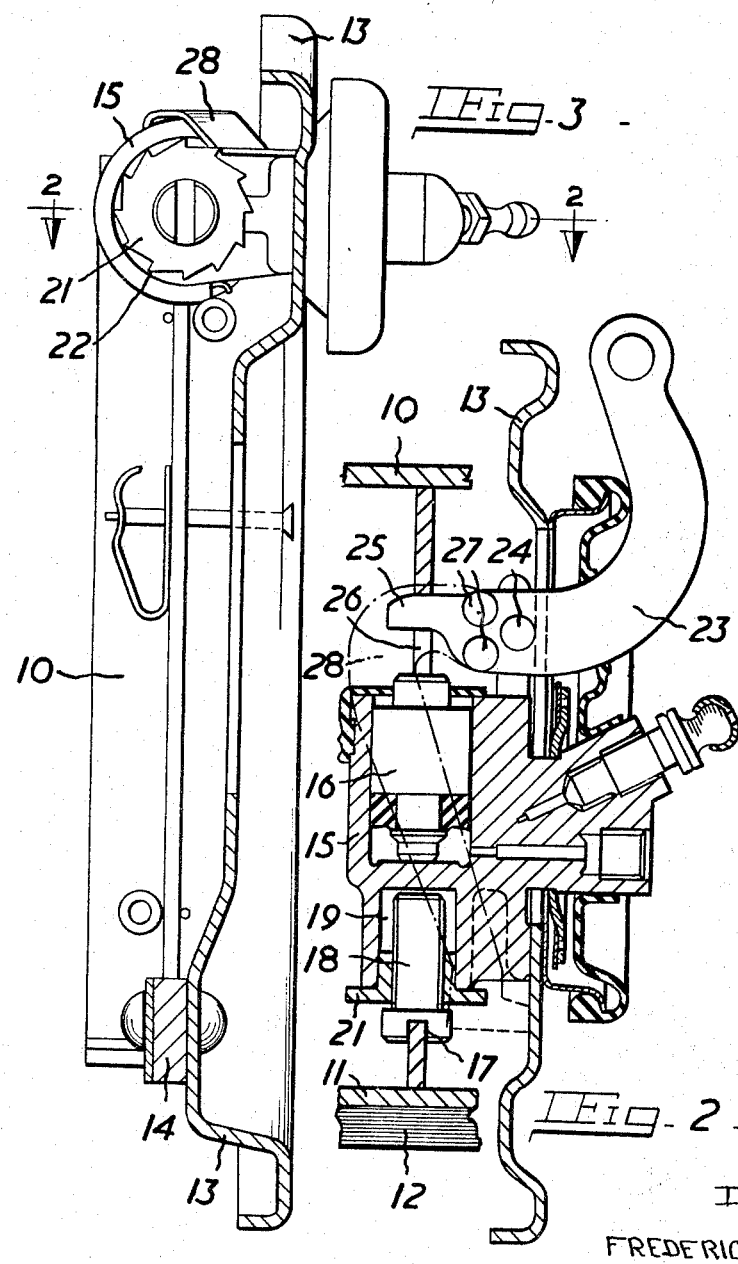

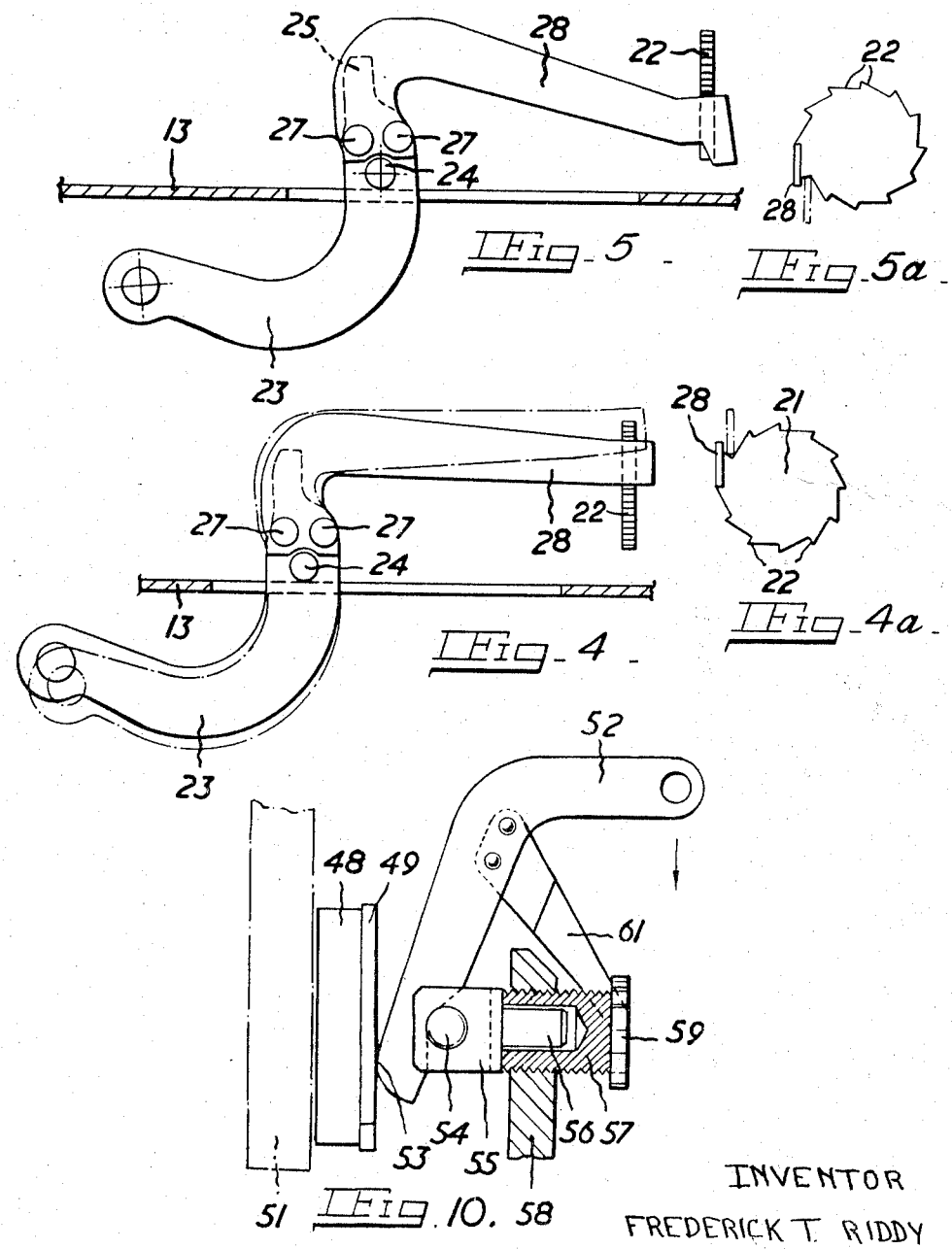

INVENTOR
FREDERICK T. RIDDY

BY Scrivener + Parker
ATTORNEYS

United States Patent Office 3,323,618
Patented June 6, 1967

3,323,618
AUTOMATIC ADJUSTER FOR VEHICLE BRAKES
Frederick Thomas Riddy, Birmingham, England, assignor to Girling Limited, Tyseley, Birmingham, England, a British company
Continuation of application Ser. No. 269,289, Apr. 1, 1963. This application Sept. 21, 1965, Ser. No. 495,009
11 Claims. (Cl. 188—79.5)

This application is a continuation of my prior U.S. application Ser. No. 269,289 now abandoned.

This invention relates to a new or improved automatic adjuster for vehicle brakes of the kind in which friction members such as shoes or friction pads are applied to a rotatable member by two independently operable actuating means.

According to my invention, in a vehicle brake of that kind, a friction member is applied to a rotatable member such as a drum or disc by independently operable actuating means of which one is mechanical and incorporates a transmission member of adjustable length which, when wear of the friction member has taken place, is adjusted by a part of the actuator on application or release of the brake. One actuator may apply the friction members through a part of the other actuator of adjustable length, the adjustment being effected automatically by a part of the first actuator when the movement of that part in the application of the brake exceeds a predetermined value owing to wear of the friction members.

Some practical forms of automatic adjustor in accordance with our invention are illustrated by way of example in the accompanying drawings in which:

FIGURE 1 is a front elevation of a shoe drum brake incorporating hydraulic and mechanical actuators for separating the shoes;

FIGURE 2 is a horizontal section on the line 2—2 of FIGURE 3;

FIGURE 3 is a vertical section on the line 3—3 of FIGURE 1;

FIGURE 4 is a fragmentary detail view of the resilient adjusting finger shown in FIGURES 1 to 3;

FIGURE 4a is an end view of FIGURE 4;

FIGURE 5 is a view similar to FIGURE 4 but showing a modification;

FIGURE 5a is an end view of FIGURE 5;

FIGURE 6 is an end view of the caliper of a disc brake incorporating hydraulic and mechanical actuators;

FIGURE 7 is a section on the line 7—7 of FIGURE 6;

FIGURES 10 and 11 are respectively a side elevation and an end view of an automatic adjuster for a mechanical actuator for a disc brake.

Figure 8:
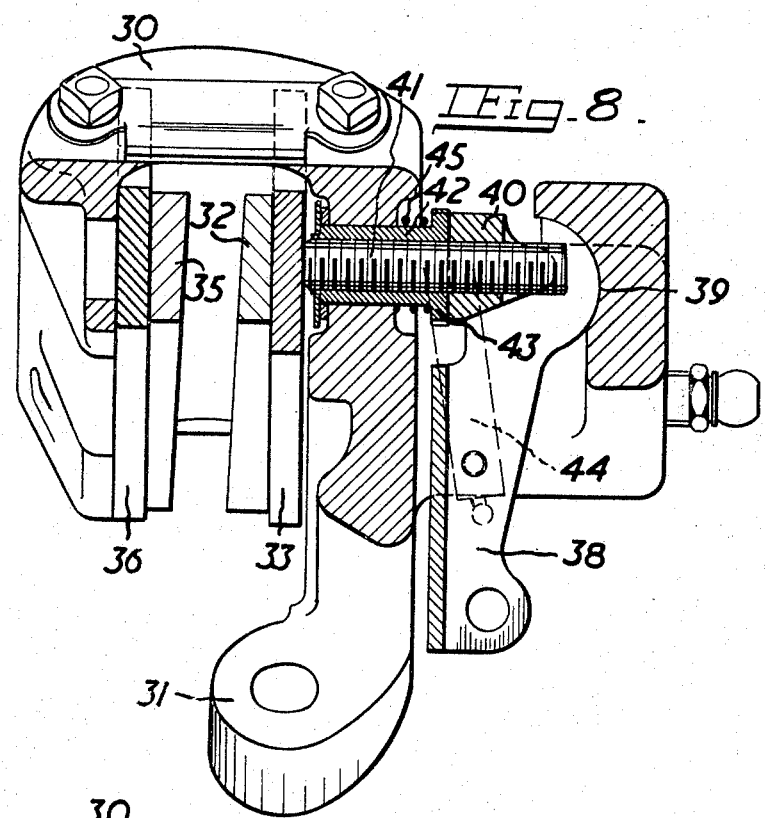
FIGURE 8 is a section on the line 8—8 of FIGURE 6.

In the brake shown in FIGURES 1 to 3, two opposed arcuate brake shoes 10, 11 carrying linings 12 of friction material for engagement with a rotatable brake drum (not shown) are mounted on a stationary back-plate 13. The non-actuated ends of the shoes are adapted to rock and slide on stationary abutments on opposite ends of a block 14 fixed to the back-plate between the shoe ends. The other ends of the shoes are normally separated to apply the brake by a single-ended hydraulic cylinder and piston assembly located between them. The cylinder 15 is mounted in known manner on the back-plate for movement therein in a direction substantially parallel to the line of movement of the shoe ends. The web of the shoe 10 is engaged directly by the piston 16 and the web of the shoe 11 is received in a notch 17 in the outer end of a screw-threaded tappet 18 which is axially movable in a blind bore 19 in the closed end of the cylinder 15 in alignment with the cylinder bore.

The tappet is screwed through a nut member 21 which bears against the end of the bore 19 and forms an abutment for the tappet. The nut member has peripheral ratchet teeth 22.

The shoes are also separated mechanically from a hand-lever or the like for parking or emergency braking. The hand-lever is connected through a rod or cable to one arm 23 of a bell-crank lever pivoted on a pin 24 in lugs on the hydraulic cylinder 15. The other arm 25 of the bell crank lever is engaged in a slot 26 in the web of the shoe 10. When a pull is applied to the arm 23 of the lever in a direction away from the back plate, the lever is moved angularly about its pivot and the arm 25 moves the shoe outwardly into engagement with the drum while the reaction on the pivot pin moves the hydraulic cylinder 15 in the opposite direction to apply the shoe 11 to the drum.

The arm 25 has secured to it by rivets 27 or other convenient means an offset resilient finger 28 which extends lengthwise alongside the cylinder assembly and engages at its free end with the ratchet teeth 22 on the periphery of the nut member 21. When the angular movement of the bell crank lever in the application of the brake from the hand lever exceeds a predetermined value owing to wear of the friction linings, the free end of the finger rides over one or more of the ratchet teeth, and on the return movement of the lever the finger moves the nut member angularly in a direction to increase the effective length of the tappet and hence of the cylinder and piston assembly. This arrangement of the finger and ratchet teeth is shown in detail in FIGURE 4.

In the alternative arrangement shown in FIGURE 5, the direction of the ratchet teeth is reversed and the finger is modified so that the angular movement of the nut member is effected on the brake applying movement of the bell crank lever and the finger rides over one or more of the ratchet teeth on the return movement of the lever. The finger is sufficiently resilient to allow it to deflect on application of the brake after the clearance between the shoes and the drum has been taken up.

In a modification, the tappet may be in screw-threaded engagement with the bore in the closed end of the cylinder in which case the ratchet teeth are formed on the periphery of a flange or collar on the tappet and the tappet itself is rotated by the finger on the bell crank lever.

The adjustment affects both actuating means and takes place at the actuated ends of the shoes where loading conditions are lowest.

FIGURES 6, 7 and 8 show an adjuster embodied in the actuating mechanism of a disc brake. In these drawings, 30 is a rigid caliper which straddles a portion of the periphery of a rotatable disc (not shown) and is mounted for angular movement about a stationary pin received in inwardly extending lugs 31, the axis of the pin being at right angles to the axis of the discs.

For service braking, a friction pad 32 carried by a backing-plate 33 is urged into engagement with one face of the disc by a piston 34 working in an hydraulic cylinder 35 in one limb of the caliper, a friction pad 36 carried by a backing-plate 37 located on the inner face of the other limb of the caliper being urged into engagement with the other face of the disc by the reaction on the caliper.

For parking or emergency braking, the brake can also be applied by a mechanical actuator mounted in the caliper and offset circumferentially from the hydraulic cylinder. A hand lever or the like is connected by a pull-rod or cable to the inner end of a lever 38 which is located in a gap in the caliper limb housing the hydraulic cylinder, and has on its side remote from the disc an arcuate surface 39 in rocking engagement with a complementary recess in the outer side of the gap. The lever bears on a thrust block 40 which is slidably mounted on a rod 41 of which the inner end bears on the backing plate 33 of the friction pad 32. The rod is screw threaded and an abutment for the thrust block 40 is formed by a sleeve 42 in screw-threaded engagement with the rod. A radial flange 43 on the outer end of the sleeve is formed with peripheral ratchet teeth which are engaged by a resilient finger 44 secured to one side of the caliper. The sleeve is guided in a bore in the caliper for movement in a direction substantially at right angles to the plane of the disc and is loaded by a spring 45 urging it towards the off position.

When the angular movement of the lever 38 in the application of the brake by the hand lever exceeds a predetermined value owing to wear of the friction pads, the finger, through the ratchet teeth on the sleeve, moves the sleeve angularly to increase the effective length of the rod and sleeve assembly.

The angular adjusting movement of the sleeve may be effected on the applying or return movement of the lever 38.

Figure 9:
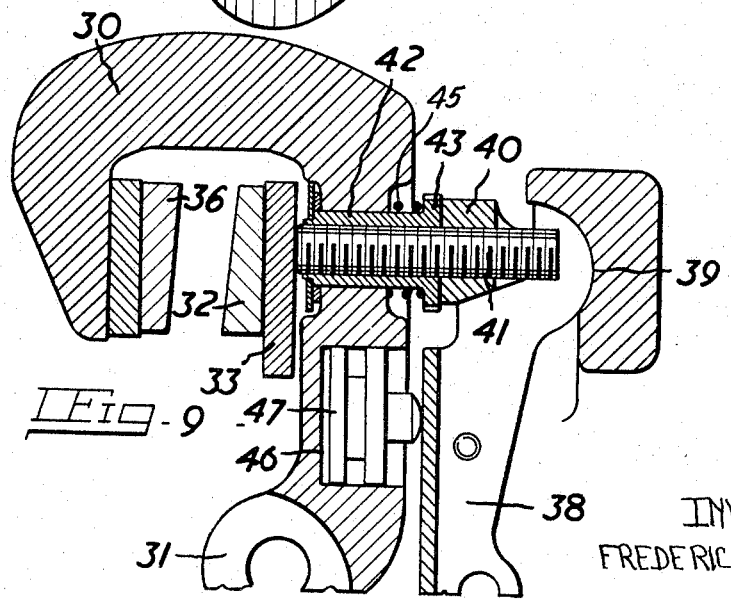
FIGURE 9 is a section showing a modified arrangement of hydraulic and mechanical actuators for a disc brake.

FIGURE 9 shows a modification of the construction shown in FIGURES 6, 7 and 8 in which the hydraulic application of the brake is effected through the lever 38. An hydraulic cylinder 46 is located in the caliper radially inwards from the mechanical actuator, and a piston 47 working in the cylinder acts directly on the lever 38 to apply the brake from a pedal for service braking. In this arrangement, the thrust rod acts on the friction pad substantially centrally.

In the arrangement illustrated in FIGURES 10 and 11, a friction pad 48 carried by a backing plate 49 is adapted to be applied to a rotatable disc 51 by a cranked lever 52. The backing plate is engaged by a rounded nose 53 on one end of the lever and adjacent to the nose the lever fulcrums on a pin 54 mounted in the inner end of a stud 55. The stud has a reduced stem 56 which is received in an axial recess in an externally screw-threaded member 57 which is adjustably screwed through a part 58 of a caliper which straddles a portion of the periphery of the disc. The rear end of the member 57 is formed with a radially projecting flange having peripheral ratchet teeth 59 co-operating with a pawl 61 formed by a resilient finger secured to the lever.

The brake is applied by a pull on the free end of the lever in the direction of the arrow. The lever rocks about the fulcrum pin 54, and the nose 53 on the lever urges the friction pad into engagement with the disc. As the lever moves angularly to apply the brake, the pawl 61 moves the member 57 angularly according to the amount of wear to be taken up so that the member 57 is advanced to advance the pad 48 to take up that wear. On the return movement the pawl moves back over a corresponding number of teeth 59.

When the friction pad 48 is urged into engagement with the disc by the lever 52, the reaction on the caliper through the fulcrum pin moves the caliper axially to bring into engagement with the opposite face of the disc a second friction pad (not shown) located in the caliper on the other side of the disc.

The alternative actuation of the friction pad 48 may be effected by hydraulic means coupled to the lever 52 or acting on the pad in parallel with the lever.

I claim:

1. A shoe drum brake comprising a rotatable drum, a pair of arcuate shoes, carrying friction linings for engagement with said drum and mounted on a stationary back plate, first and second independently operable means for separating adjacent shoe ends and applying said shoes to said drum of which said first actuating means is located between said adjacent shoe ends and incorporating a transmission member of adjustable length, and a resilient pawl carried by and movable with said second actuating means and adapted to adjust automatically the length of said transmission member when movement of said second actuating means exceeds a predetermined value in the application of the brake when wear of the friction linings has taken place, said pawl being adapted to deflect resiliently on application of the brake after the length of the transmission member has been adjusted to compensate for wear of the friction linings.

2. A shoe drum brake comprising a rotatable drum, a pair of arcuate shoes carrying friction linings for engagement with said drum and mounted on a stationary back plate, a single-ended hydraulic cylinder and piston assembly located between adjacent shoe ends and mounted on the stationary back-plate for movement in a direction parallel to the direction of movement of the shoe ends, of which the piston acts directly on one shoe and the cylinder acts on the other shoe through a thrust member of adjustable length, a lever for separating the shoes independently of said piston and cylinder assembly pivoted on the cylinder and engaging with the shoe on which said cylinder acts, a resilient finger carried by the lever and adapted to co-operate with ratchet teeth on a part of said thrust member to effect an adjustment of said thrust member when the angular movement of the lever in the application of the brake by the lever exceds a predetermined value, said resilient finger being adapted to deflect resiliently on application of the brake by the lever after the length of the thrust member has been adjusted.

3. A shoe drum brake as claimed in claim 2, wherein said thrust member comprises a tappet in screw-threaded engagement with a bore in the closed end of the cylinder of which the outer end is formed with peripheral teeth adapted to be engaged by said resilient finger.

4. A shoe drum brake as claimed in claim 2, wherein said thrust member comprises a tappet in screw-threaded engagement with a flanged sleeve rotatably mounted in a bore in the cylinder and bearing on the outer end of the bore, and the tappet at its outer end is formed with peripheral teeth adapted to be engaged by said resilient finger.

5. A disc brake comprising a rotatable disc, friction pads for engagement with opposite faces of the disc of which at least one is axially movable, an hydraulic cylinder and piston assembly for applying said axially movable friction pad to said disc, a mechanical actuator for applying said axially movable friction pad to said disc comprising a lever acting on the friction pad through a thrust member of which the effective length is adjustable, said thrust member including a ratchet member, a resilient finger rigidly connected at one end to said lever and engaging said ratchet member at its opposite end, said finger being deflectable to facilitate return movement of said finger past said ratchet member during release movement of said finger with said lever, said finger cooperating with said ratchet member during application movement of said lever to automatically increase the length of the thrust member when movement of the lever in a brake applying direction exceeds a predetermined value due to wear of the friction pads, said finger being constructed and designed to deflect resiliently during application movement of said lever and while in engagement with a tooth of said ratchet member to prevent adjustment of the length of said thrust member when the loading to which the finger is subjected during brake application exceeds a predetermined value.

6. A disc brake comprising a rotatable disc, a caliper adapted to straddle a portion of the periphery of the disc and mounted for angular movement relative to the disc about a fixed pivot, friction pads for engagement with opposite faces of said disc located in opposed limbs of the caliper and of which one of said friction pads is axially movable, an hydraulic cylinder and piston assembly for urging said axially movable friction pad into engagement with said disc and housed within an adjacent limb of said caliper, said other friction pad being urged into engagement with the opposite face of said disc by the reaction on said caliper causing it to move angularly about its pivot, a mechanical actuator for applying said axially movable friction pad to said disc comprising a lever acting on said friction pad through a thrust member of which the effective length is adjustable, said thrust member including a ratchet member, said other friction pad being urged into engagement with the opposite face of said disc by the reaction on said caliper, a resilient finger rigidly connected at one end to said lever and engaging said ratchet member at its opposite end, said finger being deflectable to facilitate return movement of said finger past said ratchet member during release movement of said finger with said lever, said finger cooperating with said ratchet member during application movement of said lever to automatically increase the length of the thrust member when movement of the lever in a brake applying direction exceeds a predetermined value due to wear of the friction pads, said finger being constructed and designed to deflect resiliently during application movement of said lever and while in engagement with a tooth of said ratchet member to prevent adjustment of the length of said thrust member when the loading to which the finger is subjected during brake application exceeds a predetermined value.

7. A disc brake comprising a rotatable disc, a caliper adapted to straddle a portion of the periphery of the disc and mounted for angular movement relative to the disc about a fixed pivot, friction pads for engagement with opposite faces of said disc located in opposed limbs of said caliper and of which one of said friction pads is axially movable, a thrust member of which the effective length is adjustable acting directly on the axially movable friction pad and slidable in an adjacent limb of the caliper in a direction substantially at right angles to the plane of the disc, said thrust member including a ratchet member, a lever for applying said axially movable friction pad to said disc mechanically through said thrust member, said other friction pad being urged into engagement with the opposite face of said disc by the reaction on said caliper, an hydraulic cylinder and piston assembly housed in the limb of the caliper in which the thrust member is slidable and located radially inwards from said thrust member, said cylinder and piston assembly adapted to apply said axially movable friction pad to said disc through said lever and said thrust member, and a resilient finger rigidly connected at one end to said lever and engaging said ratchet member at its opposite end, said finger being deflectable to facilitate return movement of said finger past said ratchet member during release movement of said finger with said lever, said finger cooperating with said ratchet member during application movement of said lever to automatically increase the length of the thrust member when movement of the lever in a brake applying direction exceeds a predetermined value due to wear of the friction pads, said finger being constructed and designed to deflect resiliently during application movement of said lever and while in engagement with a tooth of said ratchet member to prevent adjustment of the length of said thrust member when the loading to which the finger is subjected during brake application exceeds a predetermined value.

8. A vehicle brake comprising a rotatable braking member, at least one braking surface on said rotatable member, a friction member engageable with said braking surface, a transmission member of adjustable length operatively connected with said friction member for moving the same into engagement with said braking member, said transmission member including a ratchet member, actuating means cooperating with said transmission member for operating the same, a pawl of resilient material rigidly connected at one end thereof to said actuating means and engaging said ratchet member adjacent its opposite end, said pawl being deflectable to facilitate return movement of said pawl past said ratchet during release movement of said pawl with said actuating means, said pawl cooperating with said ratchet member during application movement of said actuating means to automatically increase the length of said transmission member when movement of the actuating means in a brake-applying direction exceeds a predetermined value due to wear of the friction member, said pawl deflecting resiliently while in engagement with a tooth of said ratchet member to prevent adjustment of the length of said transmission member when the loading to which the pawl is subjected exceeds a predetermined value.

9. A vehicle brake in accordance with claim 8 wherein said actuating means comprises lever means operable to apply the brakes, said pawl being rigidly connected at one end thereof to said lever means.

10. A vehicle brake in accordance with claim 9 including means for manually operating said lever means.

11. A vehicle brake in accordance with claim 9 including hydraulic cylinder and piston means cooperating with said lever means for actuating the same to apply the brakes.

References Cited

UNITED STATES PATENTS

| | | | |
|---|---|---|---|
| 2,119,903 | 6/1938 | Brisson et al. | 188—79.5 |
| 2,224,197 | 12/1940 | Schlueter | 188—79.5 |
| 3,059,731 | 10/1962 | Gancel et al. | 188—196 X |
| 3,067,840 | 12/1962 | Werner | 188—79.5 |
| 3,095,949 | 7/1963 | Butler | 188—106 X |
| 3,129,789 | 4/1964 | Hodkinson | 188—196 X |
| 3,199,639 | 8/1965 | Newton | 188—106 |

DUANE A. REGER, *Primary Examiner.*